(12) United States Patent
Satoyama et al.

(10) Patent No.: US 10,846,023 B2
(45) Date of Patent: Nov. 24, 2020

(54) STORAGE DEVICE AND STORAGE AREA MANAGEMENT METHOD FOR REDUCING GARBAGE COLLECTION PROCESSING

(71) Applicant: HITACHI, LTD., Tokyo (JP)

(72) Inventors: Ai Satoyama, Tokyo (JP); Tomohiro Kawaguchi, Tokyo (JP); Yoshihiro Yoshii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/330,944

(22) PCT Filed: Jun. 20, 2017

(86) PCT No.: PCT/JP2017/022613
§ 371 (c)(1),
(2) Date: Mar. 6, 2019

(87) PCT Pub. No.: WO2018/235149
PCT Pub. Date: Dec. 27, 2018

(65) Prior Publication Data
US 2019/0243582 A1    Aug. 8, 2019

(51) Int. Cl.
*G06F 3/06* (2006.01)
*G06F 12/10* (2016.01)
(Continued)

(52) U.S. Cl.
CPC ............. *G06F 3/0661* (2013.01); *G06F 3/06* (2013.01); *G06F 3/0604* (2013.01); *G06F 3/0673* (2013.01); *G06F 12/02* (2013.01); *G06F 12/0253* (2013.01); *G06F 12/04* (2013.01); *G06F 12/10* (2013.01); *G06F 2212/1044* (2013.01); *G06F 2212/657* (2013.01)

(58) Field of Classification Search
CPC ........ G06F 3/06; G06F 3/0604; G06F 3/0608; G06F 3/0631; G06F 3/064; G06F 3/0661; G06F 3/0665; G06F 3/0673; G06F 3/0689; G06F 12/02; G06F 12/0253; G06F 12/04; G06F 12/10; G06F 2212/1044; G06F 2212/657
See application file for complete search history.

(56) References Cited

U.S. PATENT DOCUMENTS 5,450,577 A * 9/1995 Lai ...................... G06F 11/1471
711/112
5,537,658 A * 7/1996 Bakke .................. G06F 3/0601
707/999.2
(Continued)

*Primary Examiner* — Larry T Mackall
(74) *Attorney, Agent, or Firm* — Volpe Koenig

(57) ABSTRACT

When a real area is allocated to a write destination virtual area in a virtual volume, a storage device determines whether or not a size of compressed new data is larger than a size of the allocated real area. In a case where the determination result is true, the storage device determines whether or not there is one or more real areas having a size equal to or larger than the size of the compressed new data and including a garbage area that is a real area serving as garbage. In a case where the determination result is true, the storage device selects one or more real areas including the garbage area, allocates, instead of the allocated real area, the selected one or more real areas to the write destination virtual area, and manages the allocated real area as a garbage area.

12 Claims, 15 Drawing Sheets

(51) Int. Cl.
*G06F 12/02* (2006.01)
*G06F 12/04* (2006.01)

(56) References Cited

U.S. PATENT DOCUMENTS

| | | | |
|---|---|---|---|
| 5,764,880 A * | 6/1998 | Gerdt | G06F 11/1076 714/6.32 |
| 8,527,544 B1 | 9/2013 | Colgrove et al. | |

\* cited by examiner

FIG. 4

VIRTUAL VOLUME TABLE
510

| VIRTUAL VOLUME # /511 | VIRTUAL PAGE # /512 | SIZE AFTER COMPRESSION /513 | POOL # /514 | SUB-POOL # /515 | SUB-POOL PAGE # /516 |
|---|---|---|---|---|---|
| 1 | 1 | 7.5KB | | | |
| | 2 | 1MB | | | |
| | ..... | ..... | | | |
| | 1000 | 512KB | | | |
| | | ..... | | | |
| ..... | | | | | |

FIG. 6

POOL VOLUME TABLE
660

| POOL VOLUME # | REAL PAGE # | REAL PAGE SIZE | PHYSICAL ADDRESS |
|---|---|---|---|
| 1 | 1 | 1MB | |
| | 2 | 1MB | |
| | ..... | ..... | |
| | 1000 | 512KB | |
| | | ..... | |
| ..... | | | |

661 662 663 664

STORAGE DEVICE AND STORAGE AREA MANAGEMENT METHOD FOR REDUCING GARBAGE COLLECTION PROCESSING

TECHNICAL FIELD

The present invention relates generally to storage area management.

BACKGROUND ART

A storage device, which allocates a real area (logical storage area) from a pool (real area group) to a write destination virtual area (logical address range) in a virtual volume (logical address space) and writes data in the real area, has been known. The data written in the real area is written in a physical storage area allocated to the real area. If the real area is allocated to the write destination virtual area, the storage device performs overwriting write processing, that is, overwrites new data (data to be written this time) over old data (data to be written last time).

However, in a case where the storage device compresses the data and stores in the real area, data size is changed due to compression, and the size of the compressed new data (new data after compression) may be larger than the size of the compressed old data (old data after compression) in the overwriting write processing. In this case, the compressed old data cannot be overwritten in the area stored with the compressed old data. Therefore, the storage device allocates, instead of the allocated real area, a larger real area from the pool to the write destination virtual area, and writes the compressed new data in the larger real area. The allocated real area (the real area where the compressed old data is stored) becomes garbage and is managed as an invalid real area. In the storage device, garbage capacity is not managed as free capacity, and new data is not written in the garbage. Patent Document 1 discloses a technique of enabling the garbage to be free capacity by executing garbage collection processing (hereinafter referred to as GC processing) when a certain amount of garbage is accumulated.

PRIOR ART LITERATURE

Patent Literature

PTL 1: Specification of U.S. Pat. No. 8,527,544

SUMMARY OF INVENTION

Technical Problem

The GC processing requires overhead. When the size of the compressed new data is equal to or smaller than the size of the allocated real area, the compressed new data can be overwritten to the allocated real area, thereby avoiding generation of garbage. However, the generation of garbage cannot be reliably avoided since the size of the new data after compression is determined by attributes of the new data and a compression method (for example, compression algorithm).

Solution to Problem

When a real area is allocated to a write destination virtual area in a virtual volume, a storage device determines whether or not a size of the compressed new data is larger than a size of the allocated real area. In a case where the determination result is true, the storage device determines whether or not there is one or more real areas having a size equal to or larger than the size of the compressed new data and including a garbage area that is a real area serving as garbage. In a case where the determination result is true, the storage device selects the one or more real areas including the garbage area, allocates, instead of the allocated real area, the selected one or more real areas to the write destination virtual area, and manages the allocated real area as a garbage area.

Advantageous Effect

The data is compressed and then stored in the real area, and even in a case where the size of the compressed new data exceeds the size of the allocated real area, a possibility of increasing the garbage area can be reduced.

BRIEF DESCRIPTION OF DRAWINGS

FIG. 4 shows a configuration example of a virtual volume table.

FIG. 6 shows a configuration example of a pool volume table.

DESCRIPTION OF EMBODIMENTS

Figure 1:
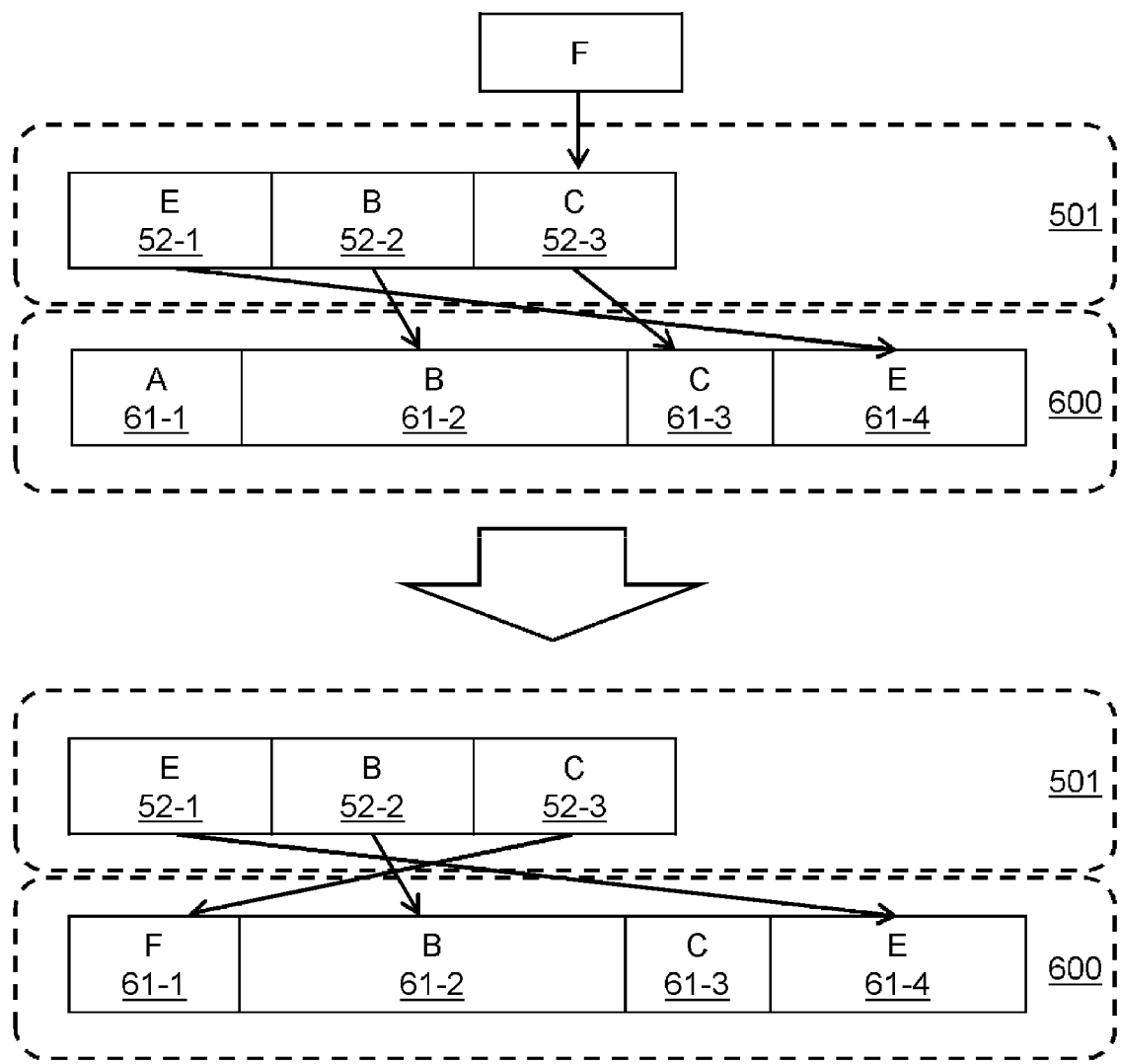
FIG. 1 is a schematic diagram showing an overview of an example of an overwriting write processing according to a first embodiment, which is performed when a size of compressed new data exceeds a size of an allocated sub-pool page.

Embodiments will be described below with reference to the drawings. However, the present embodiment is merely an example used to realize the invention, and does not limit technical scope of the invention. In the drawings, the same reference numerals denote the same configurations.

In the following description, although various information may be described in an expression "aaa table" or "aaa queue", the various information may also be expressed by a data structure other than a table or a queue. The "aaa table" or "aaa queue" may be referred to as "aaa information" to indicate that the information does not depend on the data structure.

In the following description, an "interface unit" may include one or more interface devices, specifically, at least one of a user interface unit and a communication interface unit. The user interface unit may include at least one I/O device of one or more I/O devices (for example, an input device (such as a keyboard and a pointing device) and an output device (such as a display device) and a display computer. The communication interface unit may include one or more communication interface devices. One or more communication interface devices may be one or more communication interface devices of the same type (for example, one or more network interface cards (NIC)), or two or more communication interface devices of different types (for example, the NIC and a host bus adapter (HBA)).

In the following description, a "storage unit" includes one or more memories. At least one memory of the storage unit may be a volatile memory. The storage unit is mainly used during a processing by a processor unit.

In the following description, the "processor unit" includes one or more processors. At least one processor is a typical microprocessor such as a central processing unit (CPU). The one or more processors may be single-core or multi-core. A processor may include a hardware circuit that performs a part or all of the processing. The processor unit may include a hardware circuit (for example, a field-programmable gate array (FPGA) or an application specific integrated circuit (ASIC)) that performs a part or all of the processing.

In the following description, "PDEV" refers to a physical storage device, and typically may be a nonvolatile storage device (for example, an auxiliary storage device). The PDEV may be, for example, a hard disk drive (HDD) or a solid state drive (SSD). Different types of PDEVs may be mixed in a storage system.

In the following description, "RAID" is an abbreviation for redundant array of independent (or inexpensive) disks.

In the following description, "RAID group" may be a group that includes a plurality of PDEVs and stores data according to an associated RAID level (RAID configuration), or may be a group that includes a plurality of physical storage areas and stores data according to the associated RAID level (RAID configuration).

In the following description, although numbers are used as identification information of elements, other types of identification information can also be used instead of or in addition to the numbers.

In the following description, in a case of describing the same type of elements without distinction, a common part may be used in reference numerals, and in a case of distinguishing and describing the same type of elements, reference numerals of the elements (including branch numbers) may be used.

In the description of the following embodiments, although an example of the storage device is the storage system having one or more PDEVs, a PDEV can also be adopted as an example of the storage device. When the storage device is a PDEV (for example, a flash memory device), the storage device includes one or more physical storage media (for example, flash memory chips) and a controller used to control I/O for the one or more physical storage media. Each of the PDEV and the physical storage media is an example of a physical storage resource.

First Embodiment

As will be described in detail below with reference to FIG. 2, a storage system 30 includes one or more PDEVs 34 and a controller 31 that controls data input/output (I/O) for the one or more PDEVs 34. The controller 31 is configured to compress and decompress data.

Figure 14:
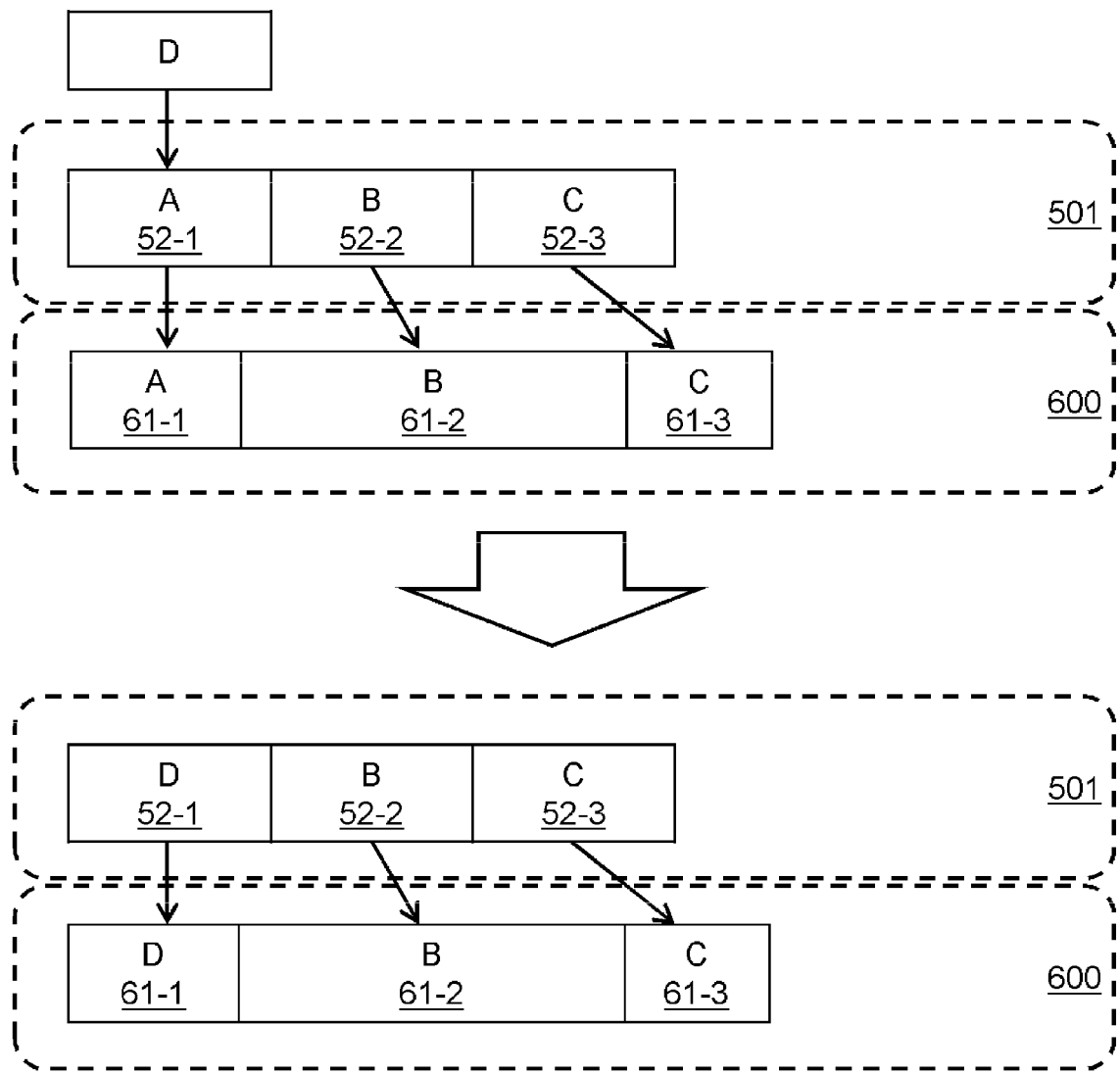
FIG. 14 is a schematic diagram showing an overview of an example of the overwriting write processing when the size of the compressed new data is equal to or smaller than the size of the allocated sub-pool page.

As shown in FIG. 14, the controller 31 manages one or more pools 600. The pool 600 is a logical storage space. At least a part of the pool 600 may be based on at least a part of a plurality of PDEVs 34, and at least a part of the pool 600 may be based on a storage area provided by a storage system (not shown) external to the storage system 30. The pool 600 includes a plurality of sub-pool pages (logical storage areas) 641 having different sizes.

The controller 31 provides a virtual volume 501 (logical address space) to a higher hierarchy device such as a host computer 10. As shown in FIG. 14, sub-pool pages 61-1, 61-2 and 61-3 are respectively allocated to virtual pages (logical address ranges) 52-1, 52-2 and 52-3 in a virtual volume 501, and compressed old data A, B and C are respectively stored in the sub-pool pages 61-1, 61-2, and 61-3.

In this situation, as shown in FIG. 14, it is assumed that the controller 31 receives a write request of new data D with the virtual page 52-1 as a write destination. The controller 31 compresses the new data D, and determines whether or not the size of the compressed new data D is equal to or smaller than the size of the sub-pool page 61-1 (or the size of compressed old data A stored in the sub-pool page 61-1) allocated to the write destination virtual page 52-1. If the determination result is true, as shown in FIG. 14, the controller 31 overwrites the compressed new data D in the allocated sub-pool page 61-1.

Figure 15:
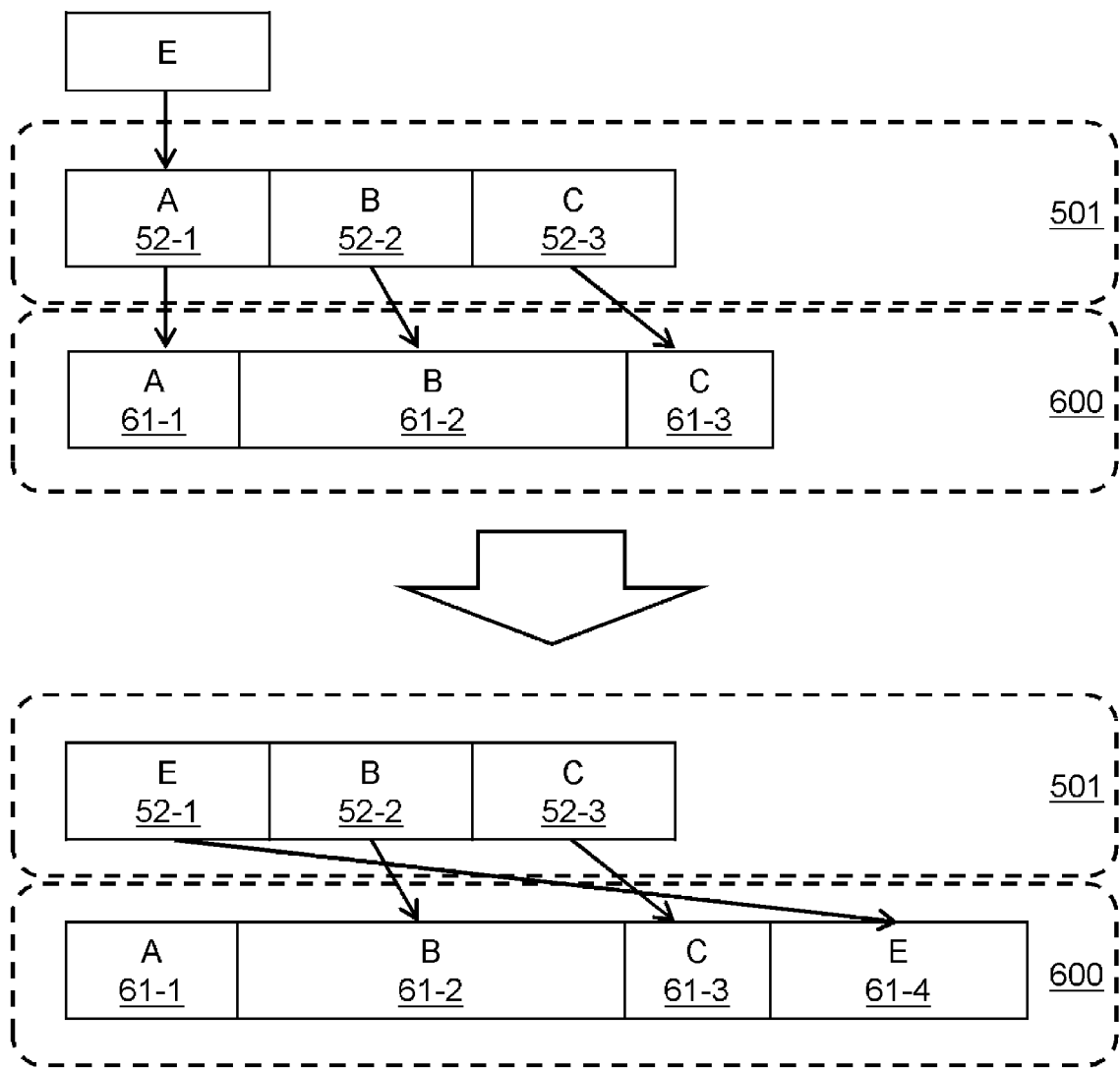
FIG. 15 is a schematic diagram showing an overview of an example of the overwriting write processing when the size of the compressed new data exceeds the size of the allocated sub-pool page.

In the above-described situation, as shown in FIG. 15, it is assumed that the controller 31 receives a write request of new data E with the virtual page 52-1 as the write destination. The controller 31 compresses the new data E, and determines whether or not the size of the compressed new data E is equal to or smaller than the size of the sub-pool page 61-1 (or the size of the compressed old data A stored in the sub-pool page 61-1) allocated to the write destination virtual page 52-1. If the determination result is false, as shown in FIG. 15, the controller 31 allocates, instead of the sub-pool page 61-1, a sub-pool page 61-4 having a larger size to the write destination virtual page 52-1, and writes the compressed new data E in the sub-pool page 61-4. As a result, the sub-pool page 61-1 becomes garbage.

In this way, the garbage is generated in the pool 600. In the present embodiment, a total amount of the garbage in the pool 600 is suppressed as follows, and as a result, load of a garbage collection processing (GC processing) can be reduced.

For example, in the situation shown in FIG. 15, that is, in a situation where the sub-pool page 61-1 exists as the garbage, the controller 31 receives a write request of new data F with the virtual page 52-3 as the write destination, as shown in FIG. 1. The controller 31 compresses the new data F, and performs a first determination that whether or not the size of the compressed new data F is equal to or smaller than the size of the sub-pool page 61-3 (or the size of compressed old data C stored in the sub-pool page 61-3) allocated to the write destination virtual page 52-3. If the result of the first determination is false, the controller 31 performs a second determination that whether or not the size of the compressed new data F is equal to or smaller than any garbage (here, the sub-pool page 61-1) (or the size of the compressed data in the garbage). If the result of the second determination is true, as shown in FIG. 1, the controller 31 allocates, instead of the sub-pool page 61-3, the garbage sub-pool page 61-1 to the write destination virtual page 52-3, and writes the compressed new data F in the allocated sub-pool page 61-1. As a result, although the sub-pool page 61-3 becomes garbage, an increase in the number of garbage can be avoided. That is, according to the present embodiment, performance of the storage system 30 can be expected to be improved since garbage is used as the write destination of the compressed new data to be overwritten (in other words, since garbage can be reused without performing the GC process in which performance is degraded due to overhead.

Figure 16:
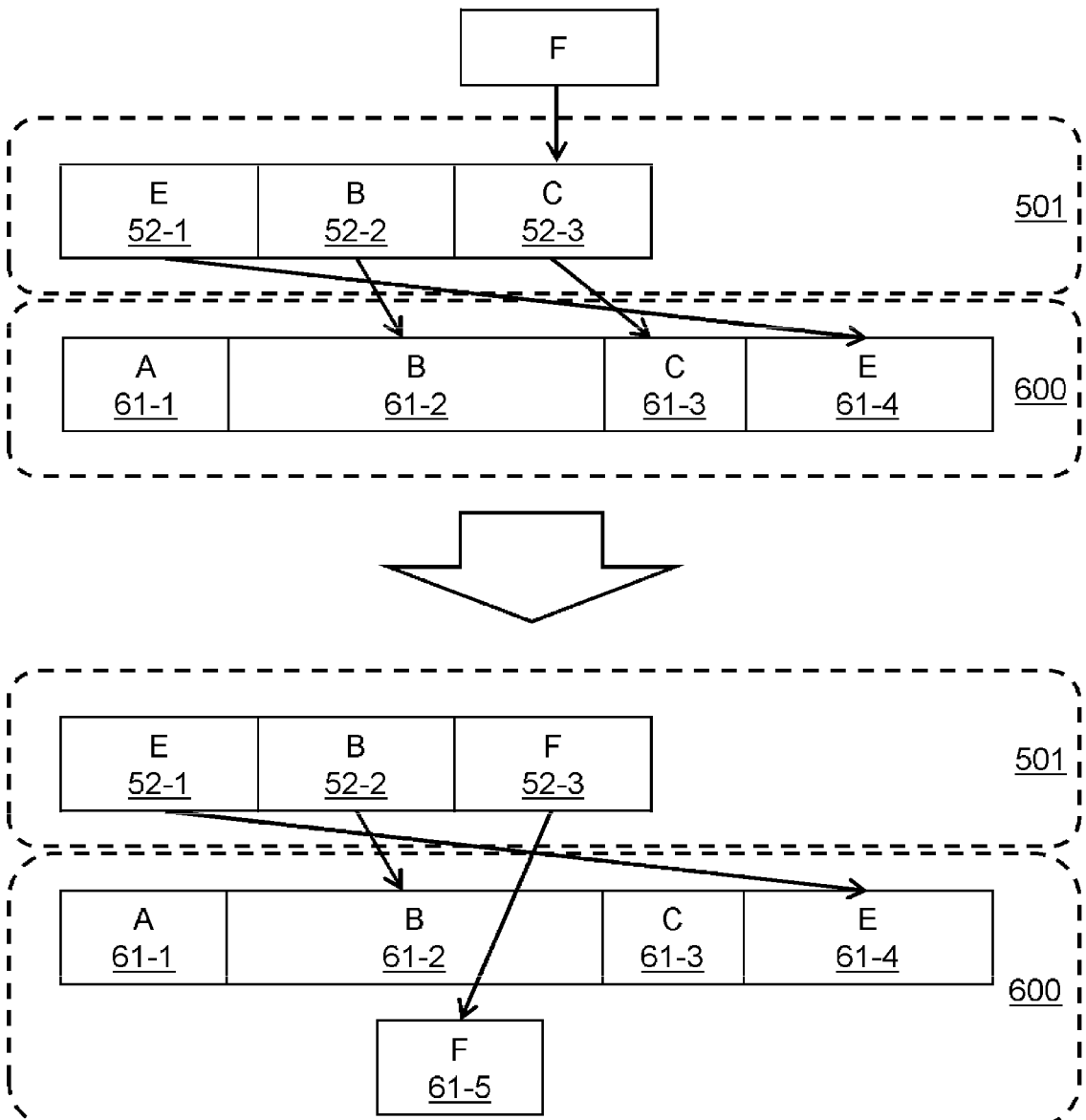
FIG. 16 is a schematic diagram showing an overview of an example of an overwriting write processing according to a comparative example, which is performed when the size of the compressed new data exceeds the size of the allocated sub-pool page.

According to a comparative example shown in FIG. 16, the second determination is not performed. That is, in a case where the result of the first determination is false, instead of the sub-pool page 61-3, a sub-pool page 61-5 having a larger size is allocated to the write destination virtual page 52-3, and the compressed new data F is written in the sub-pool page 61-5. As a result, in addition to the sub-pool page 61-1, the sub-pool page 61-3 becomes garbage. That is, the number of garbage is increased.

The present embodiment will be described in detail below.

Figure 2:
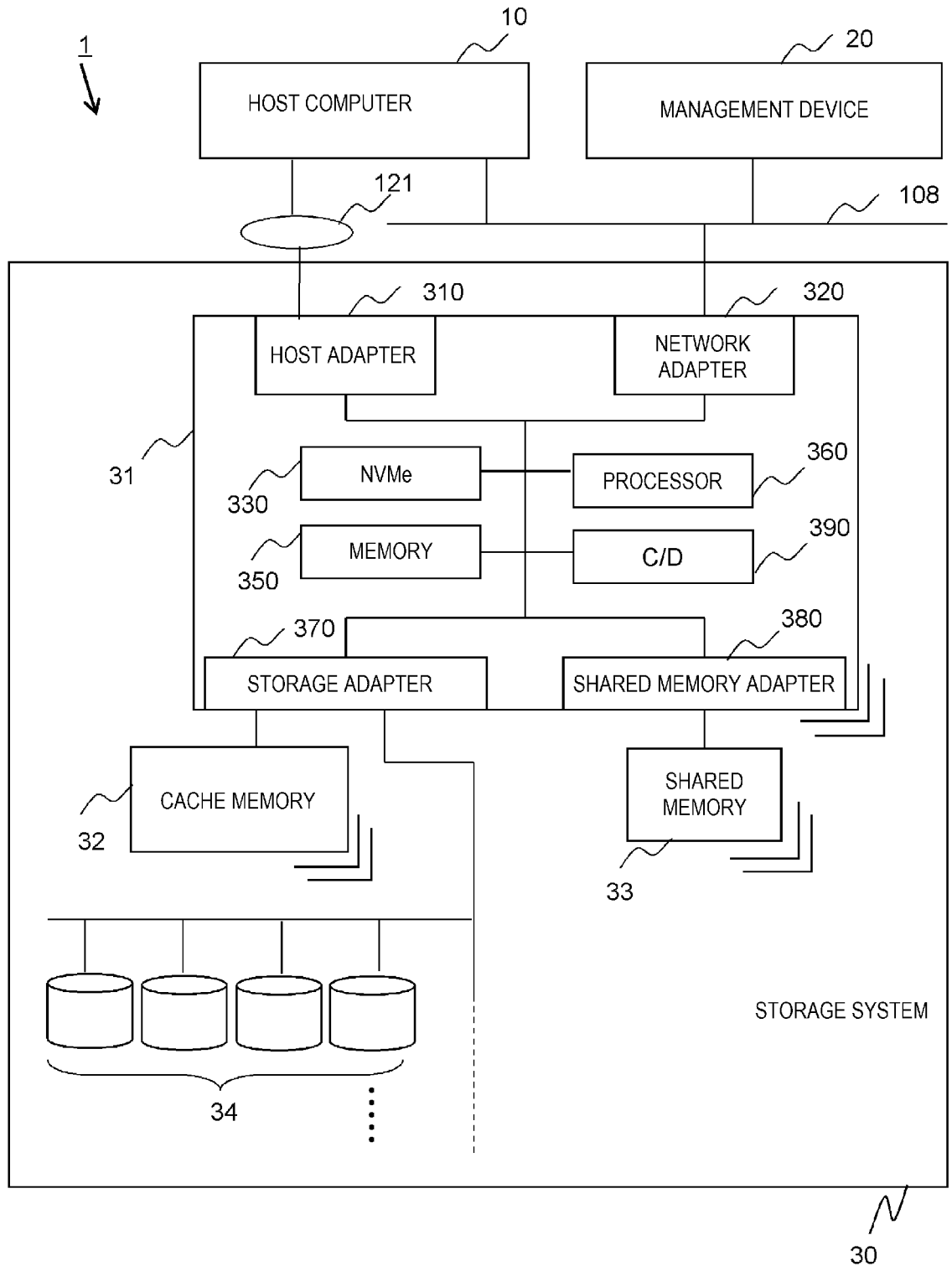
FIG. 2 shows a configuration example of a computer system according to the first embodiment.

FIG. 2 shows a configuration example of a computer system according to the present embodiment.

A computer system 1 includes at least one host computer 10 (such as a general-purpose large-scale computer, a device including a server and a general-purpose hardware component, or a general-purpose server), at least one management device 20 (such as a management computer, a device including a server and a general-purpose hardware component, or a general-purpose server) and the storage system 30 to which these are connected.

The host computer 10 accesses a logical storage resource (for example, a logical address space) of the storage system 30. The management device 20 manages configuration of storage areas of the storage system 30. The storage system 30 stores data in the storage areas based on the one or more PDEVs 34. At least one of the host computer 10 and the management device 20 may be plural.

The storage system 30 includes the plurality of PDEVs 34 and the controller 31. The controller 31 includes at least one cache memory 32 and at least one shared memory 33 externally. At least one of the cache memory 32, the shared memory 33 and the controller 31 may be redundant. In addition, hardware configuration inside the controller 31 may also be redundant.

The controller 31 controls storage of data to the storage areas based on the PDEVs 34. The cache memory 32 temporarily stores data to be read and written from and in the PDEVs 34. The shared memory 33 stores configuration information related to the controller 31 and the PDEVs 34.

The PDEV 34 may be any physical storage device, and may be, for example, an HDD or an SSD.

The controller 31 includes a host adapter 310, a network adapter 320, a nonvolatile memory (NVMe) 330, a memory 350, a storage adapter 370, a shared memory adapter 380, a compression/decompression circuit (C/D) 390 and a processor 360 connected thereto. At least one of the host adapter 310, the network adapter 320, the storage adapter 370 and the shared memory adapter 380 is an example of an interface unit. At least one of the nonvolatile memory 330, the memory 350, the cache memory 32 and the shared memory 33 is an example of a storage unit. The processor 360 is an example of a processor unit.

The host adapter 310 transmits and receives data to and from the host computer 10 via storage area network (SAN) 121. The network adapter 320 transmits and receives data necessary for system management (for example, management information) to and from the host computer 10 or the management device 20 via network 108 (for example, local area network (LAN)).

The nonvolatile memory 330 is configured by, for example, a hard disk or a flash memory, and stores programs to be operated on the controller 31, configuration information and the like.

The memory 350 may be a volatile memory such as a random access memory (RAM), and stores programs, data and the like.

The processor 360 reads a program stored in the nonvolatile memory 330 into the memory 350, and executes a processing defined by the program.

The storage adapter 370 transmits and receives data to and from the PDEVs 34 and the cache memory 32. The shared memory adapter 380 transmits and receives data to and from the shared memory 33.

The compression/decompression circuit 390 is a hardware circuit, and outputs input data after compression or decompression. At least one of the compression and decompression may be performed by the processor 360 executing a computer program instead of the hardware circuit.

An external storage system (not shown) may be connected from the network adapter 320 (or another adapter which is not shown) via the network 121 (or another network). At least a part of storage areas provided from the external storage system may be storage areas of at least a part of the above-described pool 600.

The management device 20 may not be connected.

The storage system 30 may be a computer system including one or more physical computers (for example, general-purpose computers). At least one physical computer may execute a virtual computer (for example, a virtual machine (VM)) or a software-defined anything (SDx). As the SDx, for example, a software defined storage (SDS) (virtual storage system) or a software-defined data center (SDDC) can be adopted. In this case, the host computer 10 may be a virtual computer executed in the computer system.

Figure 3:
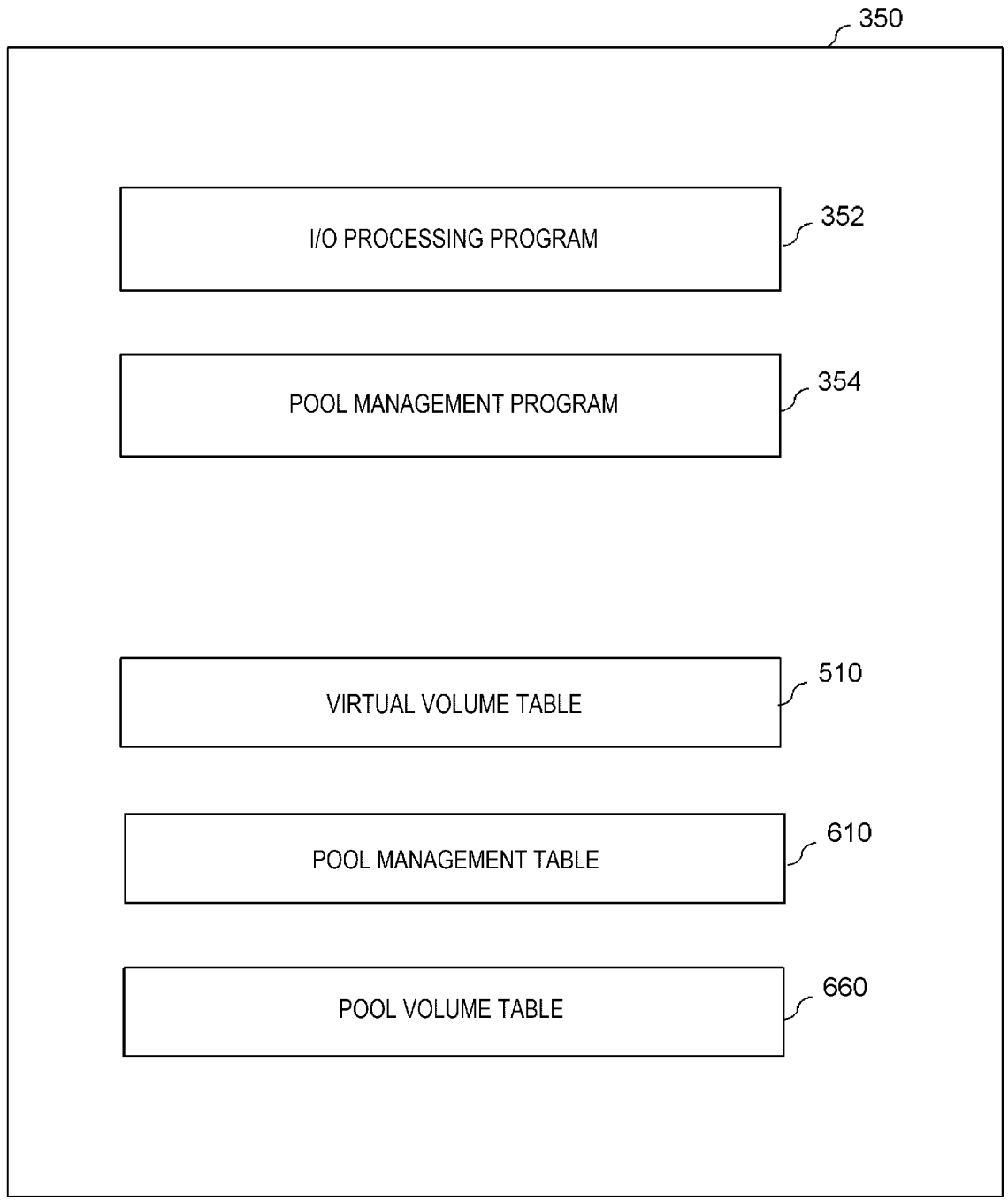
FIG. 3 shows an example of programs and management information of a storage system.

FIG. 3 shows an example of programs and management information stored in the storage system 30.

The programs and the management information are stored in the memory 350, for example. The programs are executed by the processor 360. The programs include, for example, an I/O processing program 352 and a pool management program 354. The management information includes, for example, a virtual volume table 510, a pool management table 610 and a pool volume table 660. At least a part of operation of the controller 31 is controlled by the processor 360 executing the I/O processing program 352 and the pool management program 354.

The I/O processing program 352 is a program used to perform a processing related to I/O such as storing compressed data in a page. The pool management program 354 is a program used to perform a processing related to pool management such as page selection. The virtual volume table 510 is a table that holds information on a virtual volume. The pool management table 610 is a table that holds information on the pool 600. The pool volume table 660 is a table that holds information on a pool volume. These programs and tables may be stored in the nonvolatile memory 330, in which case the programs and tables are loaded into the memory 350.

FIG. 4 shows a configuration example of the virtual volume table 510.

The virtual volume table 510 includes entries for each virtual page. Each entry stores information including a virtual volume #511, a virtual page #512, a size after compression 513, a pool #514, a sub-pool #515 and a sub-pool page #516. Hereinafter, one virtual page (a "target virtual page" in the description of FIG. 4) is taken as an example.

The virtual volume #511 is a number used to identify a virtual volume including the target virtual page. The virtual page #512 is a number used to identify the target virtual page. The size after compression 513 indicates a size of compressed data obtained by data to be written being compressed by the compression/decompression circuit 390. An appropriate sub-pool in the pool 600 (described below) can be selected with reference to the size after compression 513. The pool #514 is a number used to identify a pool including a sub-pool page allocated to the target virtual page. The sub-pool #515 is a number used to identify a sub-pool including a sub-pool page allocated to the target virtual page. The sub-pool page #516 is a number used to identify the sub-pool page allocated to the target virtual page. If the sub-pool page is not allocated to the virtual page, the value of the size after compression 513, the pool #514, the sub-pool #515 and the sub-pool page #516 are values indicating that there is no data (for example, "N/A").

Although not shown, the virtual volume table 510 may have information indicating whether or not each virtual volume corresponds to compression. Accordingly, a processing can be distinctively performed based on whether a virtual volume unit corresponds to the compression function. For a virtual volume that does not correspond to compression, the controller 31 may write data to a sub-pool page (real page) without compressing the data.

Figure 5:
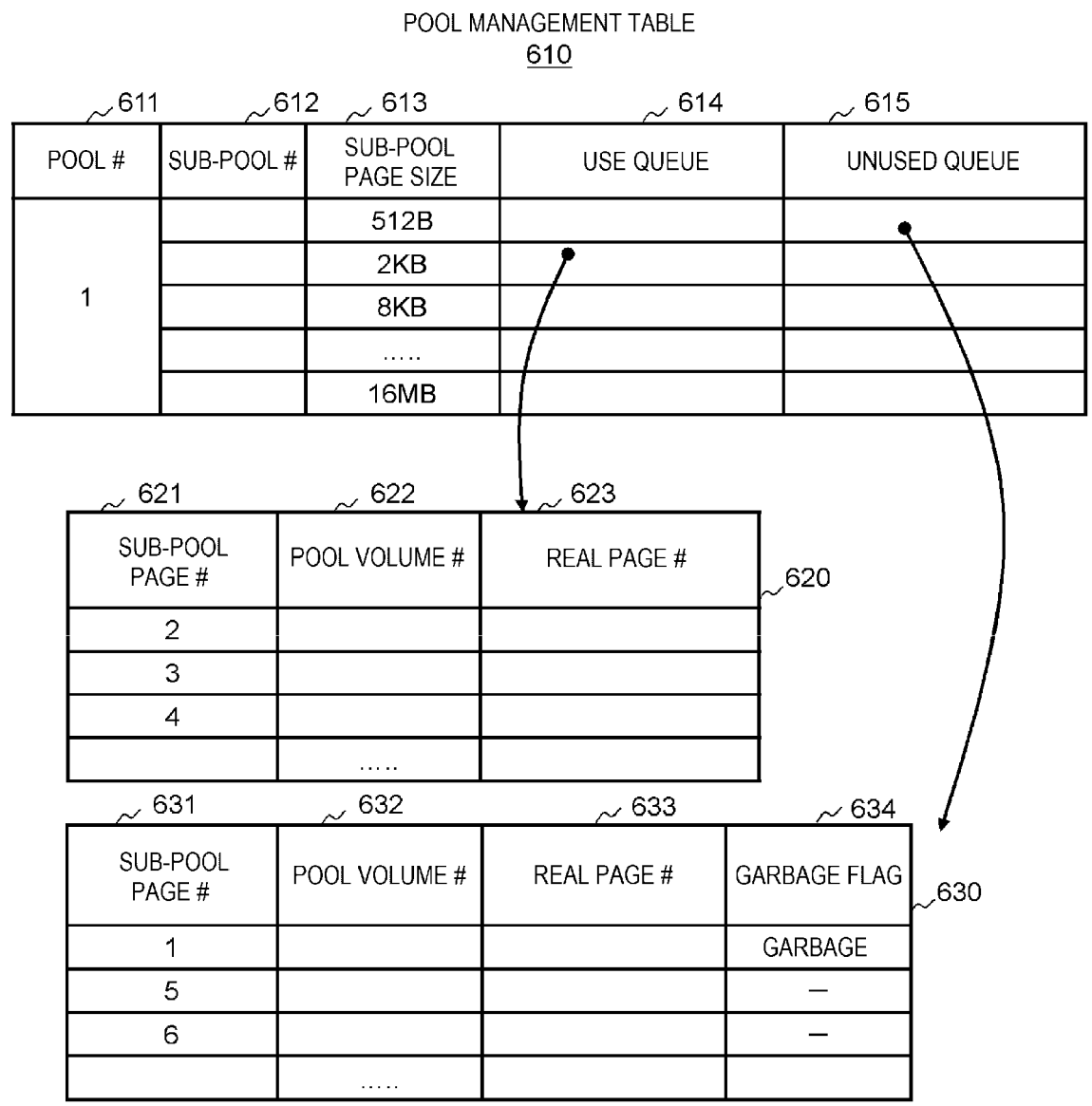
FIG. 5 shows a configuration example of a pool management table.

FIG. 5 shows a configuration example of the pool management table 610.

The storage system 30 includes one or more pools, and at least one pool includes a plurality of sub-pools having different sub-pool page sizes. Each sub-pool is a set of a plurality of sub-pool pages having the same sub-pool page size. The pool management table 610 includes entries for each sub-pool. Each entry stores information including a pool #611, a sub-pool #612, a sub-pool page size 613, a use pointer (pointer to a use page queue) 614 and an unused pointer (a pointer to an unused page queue) 615. Hereinafter, one sub-pool (a "target sub-pool" in the description of FIG. 5) is taken as an example.

The pool #611 is a number used to identify a pool including a target sub-pool. The sub-pool #612 is a number used to identify the target sub-pool. The sub-pool page size 613 indicates the size (length) of a sub-pool page in the target sub-pool.

For each sub-pool, a plurality of sub-pool pages is managed using queues in the present embodiment. The use pointer 614 indicates a head address of a queue 620 (hereinafter referred to as a use queue) that manages use sub-pool pages (a sub-pool page allocated to any of the virtual pages) in the target sub-pool. The unused pointer 615 indicates a head address of a queue 630 (hereinafter referred to as an unused queue) that manages unused sub-pool pages (a sub-pool page that is not allocated to any of the virtual pages) in the target sub-pool. The use queue 620 and the unused queue 630 are used to manage the sub-pool pages (real pages), and management using queues is adopted in the present embodiment. However, the management may also be performed by a method not using a queue.

The use queue 620 includes entries for each use sub-pool page. Each entry stores information including a sub-pool page #621, a pool volume #622 and a real page #623. Hereinafter, one use sub-pool page (a "target use sub-pool page" in the description of FIG. 5) will be taken as an example. The sub-pool page #621 is a number used to identify the target use sub-pool page. The pool volume #622 is a number used to identify a pool volume having a real page associated with the target use sub-pool page. The real page #623 is a number used to identify the real page associated with (mapped to) the target use sub-pool page.

The unused queue 630 includes entries for each unused sub-pool page. Each entry stores information including a sub-pool page #631, a pool volume #632, a real page #633 and a garbage flag 634. Hereinafter, one use sub-pool page (a "target unused sub-pool page" in the description of FIG. 5) will be taken as an example. The sub-pool page #631 is a number used to identify the target unused sub-pool page. The pool volume #632 is a number used to identify a pool volume having a real page associated with the target unused sub-pool page. The real page #623 is a number used to identify the real page associated with (mapped to) the target unused sub-pool page. The garbage flag 634 indicates whether or not the target unused sub-pool page is garbage. The target unused sub-pool page that is not garbage, is a free sub-pool page. By performing the GC processing, the controller 31 updates the garbage flag 634 corresponding to the unused sub-pool page which is garbage from "garbage" (a value that means garbage) to "-" (a value that means free).

FIG. 6 shows a configuration example of the pool volume table 660.

The pool volume table 660 includes entries for each real pool. Each entry stores information including a pool volume #661, a real page #662, a real page size 663 and a physical address 664. Hereinafter, one real page (a "target real page" in the description of FIG. 6) is taken as an example.

The pool volume #661 is a number used to identify a pool volume having a target real page. The real page #662 is a number used to identify the target real page. The real page size 663 indicates the size of the target real page. The size of the target real page and the size of the sub-pool page associated with the target real page are typically the same. The physical address 664 indicates an address of a physical storage area (for example, an address of a logical address space provided by the PDEVs 34) associated with (mapped to) the target real page.

Figure 7:
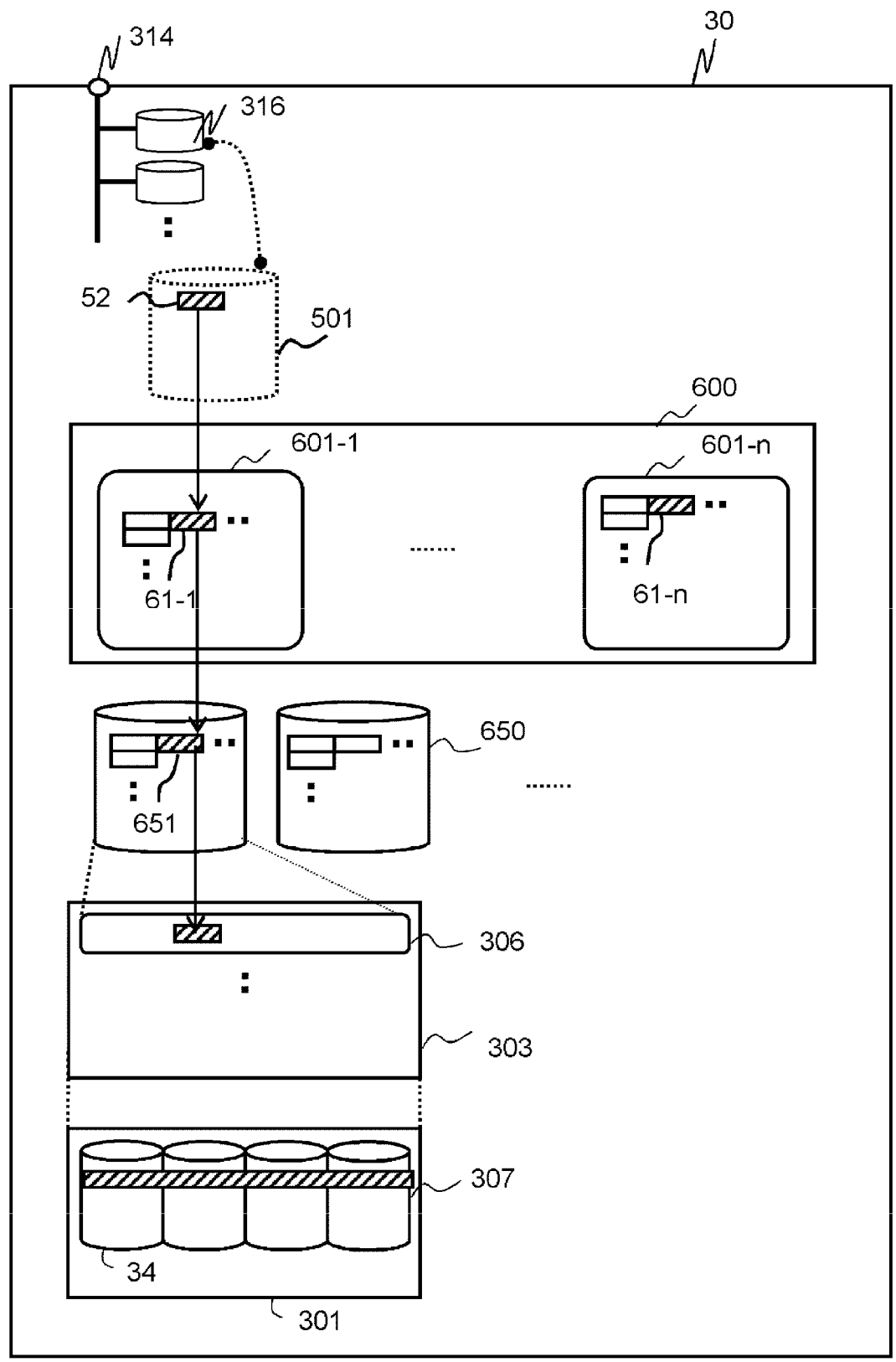
FIG. 7 shows an example of storage hierarchies in the storage system.

FIG. 7 shows an example of storage hierarchies in the storage system 30. Hereinafter, the storage areas will be described in order from a lower layer.

The plurality of PDEVs 34 configures a RAID group 301. A stripe column 307 spans the plurality of PDEVs 34.

A virtual device 303 which is a virtual storage resource based on the RAID group 301 is provided with a higher hierarchy than the RAID group 301. By dividing the virtual device 303 (storage space), a plurality of logical devices 306 are formed in the virtual device 303. The virtual device 303 may be one logical device 306. Hereinafter, the logical device will be described as a logical volume.

The pool 600 is provided with a higher hierarchy than the virtual device 303. The pool 600 includes a plurality of sub-pools 601 (for example, n sub-pools 601-1 to 601-*n*). Each sub-pool 601 has a plurality of sub-pool pages 61. The length (size) of the sub-pool page 61 is defined for each sub-pool 601. The lengths of all sub-pool pages in one sub-pool 601 are the same.

The sub-pool pages 641 are associated with real pages 651 of a plurality of pool volumes 650. A combination of the sub-pool page 61 and the real page 651 (or the sub-pool page 61) may be an example of a real area. The pool volume 650 is associated with any logical volume. The pool volume 650 is not associated with a target device specified by the host computer 10 that serves as a higher hierarchy device since the pool volume 650 is an offline volume. The pool volume 650 includes a plurality of real pages 651. In the example of FIG. 7, the real page 651 and the stripe column 307 correspond to each other in a one-to-one way. Data stored in the real page 651 is stored in the stripe column 307 corresponding to the real page 651. One real page 651 may also correspond to a plurality of stripe columns 307.

The virtual volume 501 is a logical address space provided to the host computer 10, that is, an online volume. The virtual volume 501 includes a plurality of virtual pages 52. The unused sub-pool page 61 (garbage or free sub-pool page) in the sub-pool 601 of the pool 600 is allocated to the virtual page 52 which is the write destination not allocated with a sub-pool page 61.

A target device 316 is provided with a higher hierarchy than the virtual volume 501. One or more target devices 316 are associated with a communication port 314 of a certain communication interface device. The virtual volume 501 is associated with the target device 316.

Figure 8:
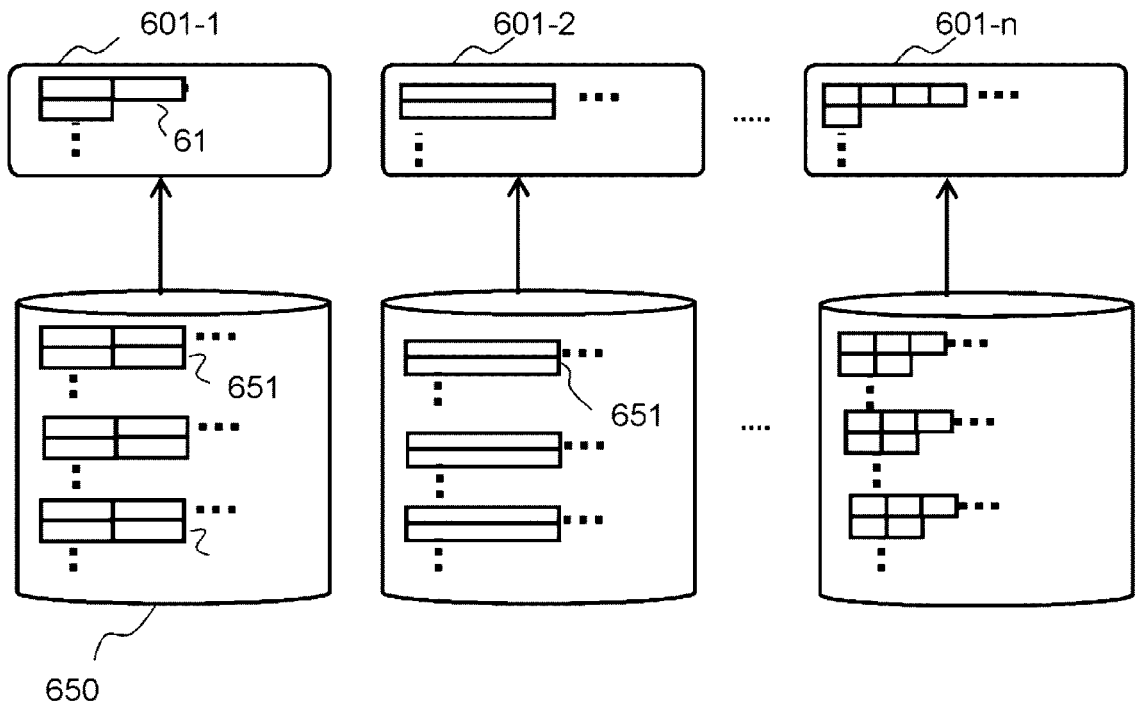
FIG. 8 shows a first example of a relationship between a pool and a pool volume.

FIG. 8 shows a first example of the relationship between the pool 600 and the pool volume 650.

The pool volume 650 includes the real pages 651 all having the same size. The sub-pool 601 and the pool volume 651 correspond to each other in a one-to-one manner.

Figure 9:
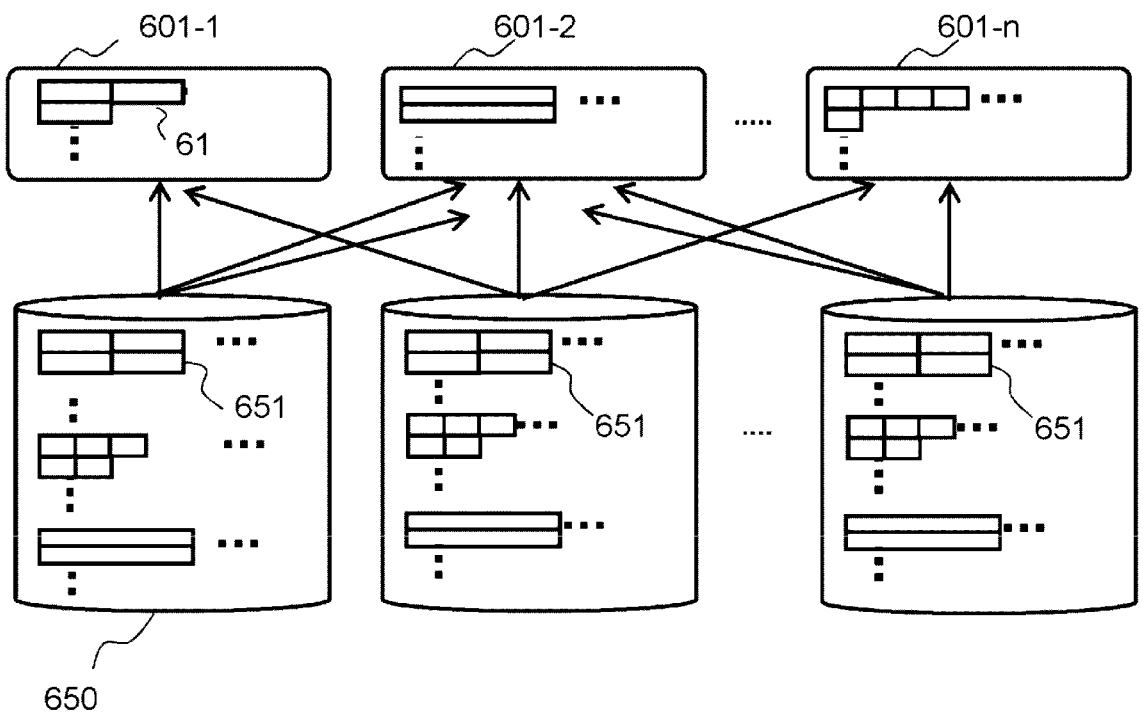
FIG. 9 shows a second example of the relationship between the pool and the pool volume.

FIG. 9 shows a second example of the relationship between the pool 600 and the pool volume 650.

The pool volume 650 includes a plurality of real pages having different sizes. The sub-pool 601 and the pool volume 651 correspond in a many-to-many manner.

Figure 10:
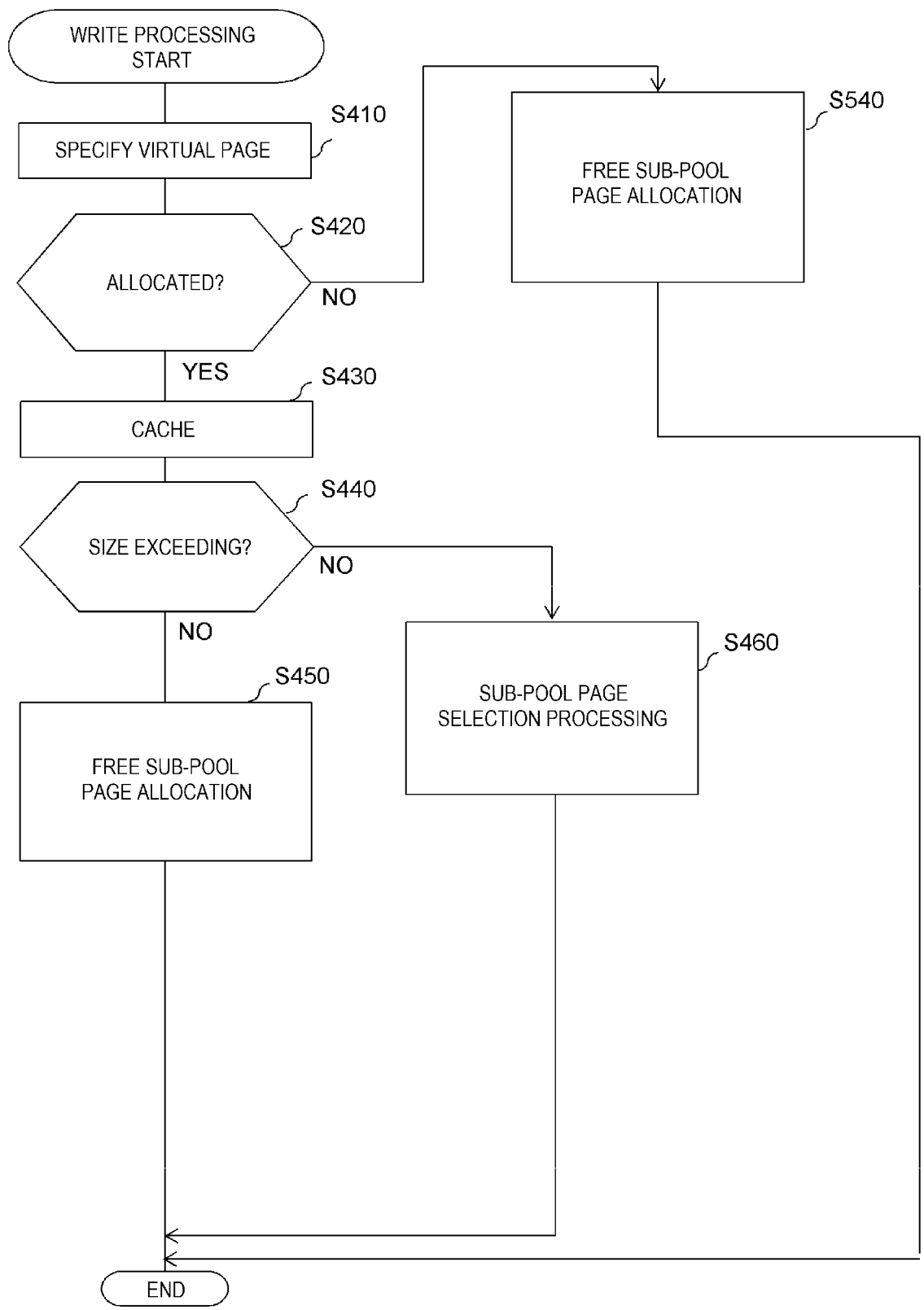
FIG. 10 is a flowchart of a write processing.

FIG. 10 is a flowchart of a write processing performed when a write request is received.

In the write request, write destination information including a virtual volume identification number (for example, a logical unit number (LUN)) and a logical address range (for example, a logical block address (LBA) and a data length) is specified. The controller 31 specifies a write destination virtual page according to the write destination information (S410). The controller 31 refers to the virtual volume table 510 and determines whether or not a sub-pool page is allocated to the write destination virtual page (S420).

If the determination result is false in S420 (S420: NO), the controller 31 performs S540, that is, performs the following.

(S420-1) The controller 31 compresses data to be written (data according to the write request) by the compression/decompression circuit 390.

(S420-2) The controller 31 stores the compressed data (data after compression by the compression/decompression circuit 390) in the cache memory 32.

(S420-3) The controller 31 refers to the pool management table 610 and specifies a free sub-pool page having a size equal to or larger than the size of the compressed data. The size of the specified free sub-pool page may be the smallest size among the sizes equal to or larger than the size of the compressed data, for example.

(S420-4) If there is a difference between the size of the compressed data and the size of the specified free sub-pool page, the controller 31 adds zero data corresponding to the difference (an example of data for padding) to the compressed data, thereby generating the compressed data for writing on the cache memory 32.

(S420-5) The controller 31 allocates the specified free sub-pool page to the write destination virtual page (for example, transmits information of the sub-pool page from the unused queue 630 to the use queue 620). As a result, the sub-pool page becomes a use sub-pool page.

(S420-6) The controller 31 writes the compressed data for writing on the cache memory 32 to the allocated sub-pool page at any timing after completion of the write request is returned to the host computer 10 (or before the completion is returned). At this time, the controller 31 refers to the pool management table 610 and the pool volume table 660, and writes the compressed data in a physical address corresponding to the sub-pool page.

If the determination result is true in S420 (S420: YES), the controller 31 performs an overwriting write processing including S430 to S460.

Specifically, the controller 31 performs the following steps in S430.

(S430-1) The controller 31 refers to the pool volume table 660, reads compressed old data from the sub-pool page allocated to the write destination virtual page (hereinafter, "allocated sub-pool page" in the description of FIG. 10) to the cache memory 32, and decompresses the read compressed old data by the compression/decompression circuit 390 to obtain old data on the cache memory 32.

(S430-2) The controller 31 overwrites new data (data to be written according to the write request) over the old data in the cache memory 32.

(S430-3) The controller 31 compresses the new data by the compression/decompression circuit 390 to obtain the compressed new data on the cache memory 32.

Next, the controller 31 determines whether or not the size of the compressed new data exceeds the size of the allocated sub-pool page (or the size of the compressed old data) in S440.

If the determination result is false in S440 (S440: NO), the controller 31 performs the following steps in S450.

(S450-1) The controller 31 refers to the pool management table 610 and specifies a free sub-pool page having a size equal to or larger than the size of the compressed new data. The size of the specified free sub-pool page may be the smallest size among the sizes equal to or larger than the size of the compressed new data, for example.

(S450-2) If there is a difference between the size of the compressed new data and the size of the specified free sub-pool page, the controller 31 adds zero data corresponding to the difference (an example of data for padding) to the compressed new data, thereby generating the compressed new data for writing on the cache memory 32.

(S450-3) The controller 31 allocates the specified free sub-pool page to the write destination virtual page instead of the allocated sub-pool page. Specifically, for example, the controller 31 transmits the information of the sub-pool page from the unused queue 630 to the use queue 620, transmits information of the allocated sub-pool page from the use queue 620 to the unused queue 630, and sets the garbage flag 634 corresponding to the allocated sub-pool page to "garbage". As a result, the sub-pool page becomes a use sub-pool page, and the allocated sub-pool page becomes garbage.

(S450-4) The controller 31 writes the compressed new data for writing on the cache memory 32 to the allocated sub-pool page at any timing after the completion of the write request is returned to the host computer 10 (or before the completion is returned).

If the determination result is true in S440 (S440: YES), the controller 31 performs the following steps in S460.

(S460-1) The controller 31 performs a sub-pool page selection processing.

(S460-2) If there is a difference between the size of the compressed new data and the size of the sub-pool page (garbage or free sub-pool page) selected in the sub-pool page selection processing, the controller 31 adds zero data corresponding to the difference (an example of padding data) to the compressed new data, thereby generating compressed new data for writing on the cache memory 32.

(S460-3) When the selected sub-pool page is a free sub-pool page, the controller 31 performs the same processing as in (S450-3) and (S450-4).

(S460-4) When the selected sub-pool page is garbage, the controller 31 performs the following processing. That is, the controller 31 allocates the selected sub-pool page which is garbage to the write destination virtual page instead of the allocated sub-pool page. Specifically, for example, the controller 31 transmits the information of the sub-pool page (garbage) from the unused queue 630 to the use queue 620, transmits the information of the allocated sub-pool page from the use queue 620 to the unused queue 630, and sets the garbage flag 634 corresponding to the allocated sub-pool page to "garbage". As a result, the garbage becomes a use sub-pool page, and the allocated sub-pool page becomes garbage. Thereafter, the controller 31 performs the same processing as in (S450-4).

Figure 11:
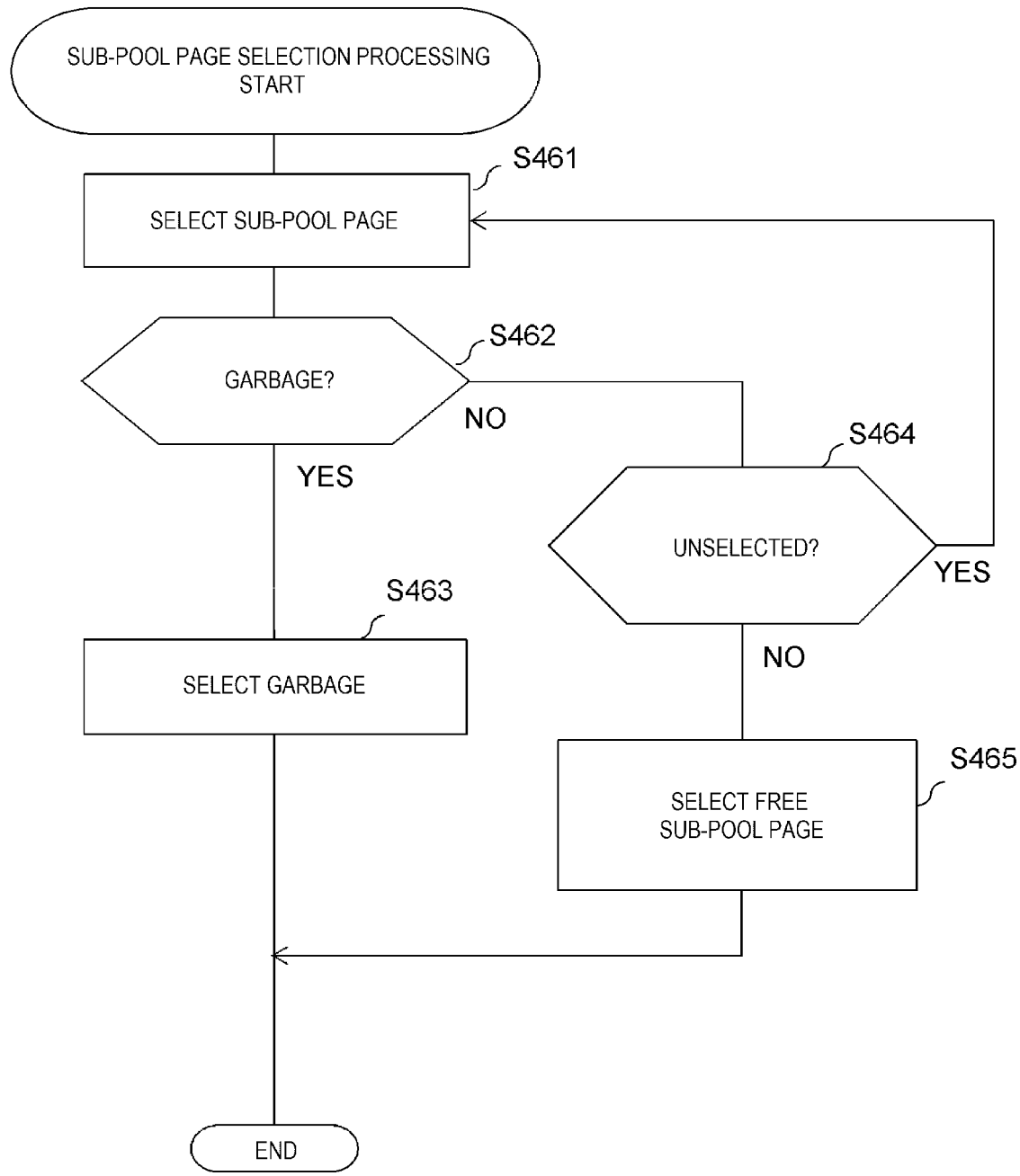
FIG. 11 is a flowchart of a sub-pool page selection processing according to the first embodiment.

FIG. 11 is a flowchart of the sub-pool page selection processing according to the present embodiment.

The controller 31 refers to the pool management table 610 and selects a sub-pool from the pool 600 (S461). Here, for example, a sub-pool including a sub-pool page having the smallest size is selected from sub-pools including sub-pool pages having a size equal to or larger than the size of the compressed new data.

The controller 31 refers to the pool management table 610 and determines whether or not there is garbage in the sub-pool selected in S461 (S462).

If the determination result is true in S462 (S462: YES), the controller 31 selects any garbage from the sub-pool selected in S461 (S463).

If the determination result is false in S462 (S462: NO), the controller 31 determines whether or not there is a sub-pool unselected in S461 and including a sub-pool page having a size equal to or larger than the size of the compressed new data (S464). If the determination result is true in S464 (S464: YES), S461 is performed. If the determination result is false in S464 (S464: NO), the controller 31 selects a free sub-pool page from the sub-pool initially selected in step S461 (for example, the sub-pool including a sub-pool page having the smallest size among the sizes equal to or larger than the size of the compressed new data) (S465).

According to the present embodiment, the controller 31 compresses the data and then writes the compressed data in the sub-pool page, and even in a case where the size of the compressed new data exceeds the size of the allocated sub-pool page, the garbage can be reused (the garbage can be selected as a sub-pool page to be allocated to the write destination virtual page), so that a possibility of increasing the garbage can be reduced. Further, the garbage having a size closest to the size of the compressed new data is reused, so that capacity efficiency can be prevented from decreasing.

Second Embodiment

A second embodiment will be described. In this case, points different from the first embodiment will be mainly described, and description of common points with the first embodiment will be omitted or simplified (the same for the third and subsequent embodiments).

Figure 12:
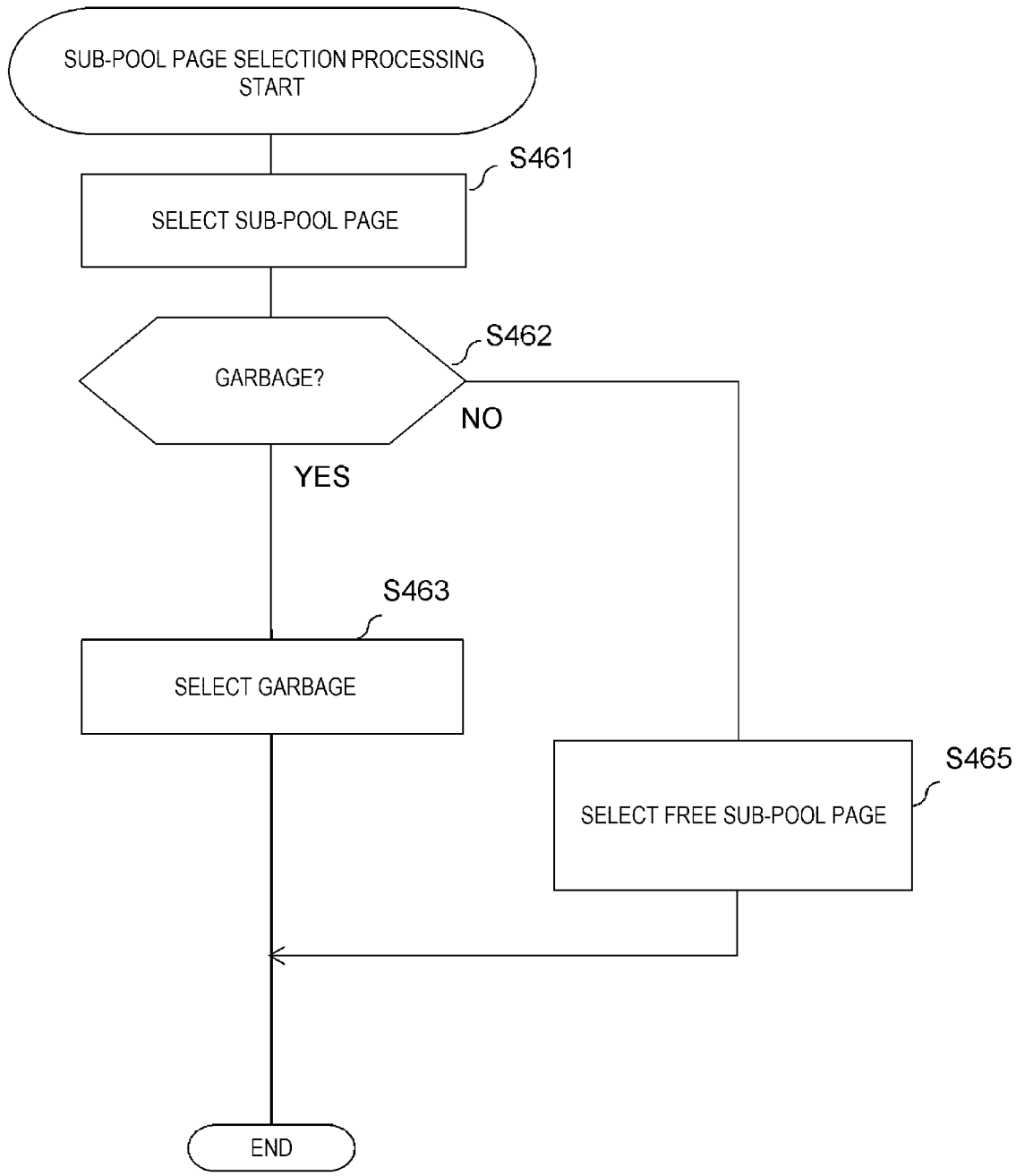
FIG. 12 is a flowchart of a sub-pool page selection processing according to a second embodiment.

FIG. 12 is a flowchart of a sub-pool page selection processing according to the second embodiment.

The sub-pool page selection processing of the write destination according to the second embodiment is different from the first embodiment in that S464 is not performed. That is, if the determination result is false in S462 (S462: NO), the controller 31 selects a free sub-pool page from the sub-pool selected in S461 (S465).

According to the second embodiment, although a possibility of reusing the garbage is reused compared to the first embodiment, the possibility of increasing the garbage can be reduced. In other words, since the free sub-pool page is selected if there is no garbage having the smallest size among the sizes equal to or larger than the size of the compressed new data, capacity efficiency is preferably avoided from decreasing as compared with the first embodiment.

Third Embodiment

Figure 13:
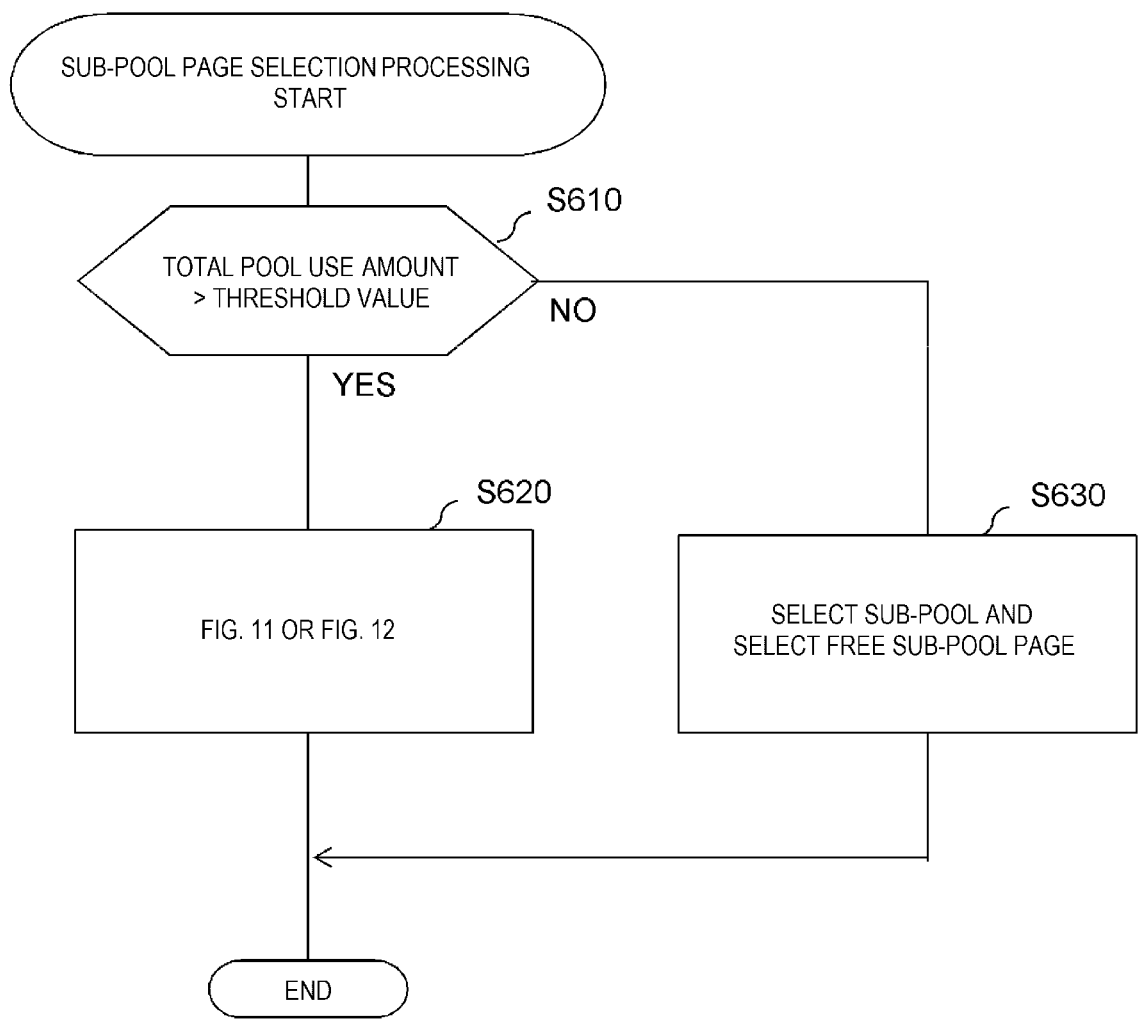
FIG. 13 is a flowchart of a sub-pool page selection processing according to a third embodiment.

FIG. 13 is a flowchart of a sub-pool page selection processing according to a third embodiment.

The controller 31 refers to the pool management table 610 and determines whether or not a total pool use amount exceeds a threshold value (S610). The "total pool use amount" is total pool use capacity or a total pool use ratio. The "total pool use capacity" is total capacity of the use sub-pool page. The "total pool use ratio" is a ratio of the total pool use capacity to pool capacity.

If the determination result is true in S610 (S610: YES), the controller 31 performs the sub-pool page selection processing shown in FIG. 11 or FIG. 12 (S620).

If the determination result is false in S610 (S610: NO), the controller 31 refers to the pool management table 610, selects a sub-pool (for example, a sub-pool including a sub-pool page having the smallest size among the sizes equal to or larger than the compressed new data or more) from the pool 600, and selects a free sub-pool page from the selected sub-pool (S630).

If the free sub-pool page is sufficient, it is considered that there is no problem even though garbage is not selected. In other words, it is considered that a situation should be avoided in which a sub-pool page able to be allocated is exhausted due to the increase in garbage when the GC processing is not carried out despite actual existence of free capacity. When garbage is little in the pool, the garbage having a size close to the size of the compressed new data may not be found. In such a case, the following problems, for example, are considered in attempting to reuse the garbage.

(x) A processing of searching the garbage leads to an increase in processing cost.

(y) If FIG. 11 is performed, in addition to (x), wasted areas may increase in the sub-pool page since garbage having a large size may be unnecessarily reused.

According to the third embodiment, the capacity efficiency can be increased while reducing overhead since the garbage is reused when a certain amount of garbage that serves as candidate is accumulated. The "total pool use amount" can also be read as "total garbage amount". The "total garbage amount" is total garbage capacity or a garbage ratio. The "total garbage capacity" is total capacity of the garbage. The "garbage ratio" is a ratio of the total garbage capacity to the pool capacity.

Fourth Embodiment

In a fourth embodiment, a garbage queue is prepared instead of the unused queue 630. The garbage queue is a queue of garbage information. One garbage queue may be prepared for each sub-pool page size, and may also be prepared for all sub-pool page sizes, or for each sub-pool page size range.

Although certain embodiments have been described, these embodiments are examples used to describe the invention, and are not intended to limit the scope of the invention. The invention can be implemented in various other forms.

For example, two or more embodiments may be combined.

For example, a plurality of sub-pool pages may be allocated to one virtual page, and the compressed new data may be written into the plurality of sub-pool pages. For example, the controller 31 may select a plurality of sub-pool pages such that a total size thereof is equal to or larger than the size of the compressed new data, and allocate the selected sub-pool pages to the write destination virtual page. The plurality of sub-pool pages may be a plurality of garbage, a plurality of free sub-pool pages or a combination of one or more garbage and one or more sub-pool pages.

REFERENCE SIGN LIST

30 . . . storage system

The invention claimed is:

1. A storage device comprising:
one or more physical storage devices; and
a controller configured to control input/output (I/O) to the one or more physical storage devices,
wherein the controller provides virtual volume that serves as a logical address space, manages a pool that serves as a logical storage space based on the physical storage devices, compresses data written in the virtual volume and writes the compressed data in the pool,
when new data for updating data to which a storage area is already allocated in the pool is written in the virtual volume, the controller:
compresses the new data;
determines that a size of the compressed new data is larger than a size of the storage area;
based on the determination that the compressed new data is larger, the controller writes the compressed new data in a different storage area;
based on the determination that the size of the compressed new data is larger than the size of the storage area, and the compressed new data is written in the different storage area, the storage area is made to be a garbage area;
based on the determination that other compressed new data is larger than the size of an other storage area, the controller determines whether the other compressed new data is smaller than or equal to a size of the garbage area, and based on the determination that the other compressed new data is not larger, the other compressed new data is written in the garbage area, the garbage area is made to be the storage area and the other storage area is made to be a different garbage area.

2. The storage device according to claim 1,
wherein the garbage area in which the other compressed new data is written is a garbage area having a smallest size among a plurality of garbage areas having a size equal to or larger than the size of the other compressed new data.

3. The storage device according to claim 1,
when a garbage area that has a size equal to or larger than the size of the other compressed new data is not found, the other compressed new data is written in an unallocated storage area.

4. The storage device according to claim 1,
wherein the different storage area is an unallocated storage area.

5. The storage device according to claim 1,
when a total pool use amount exceeds a threshold value, the controller writes the other compressed new data in the garbage area;
when the total pool use amount does not exceed the threshold value, the controller writes the other compressed new data in an unallocated storage area.

6. The storage device according to claim 1, wherein based on the determination that the compressed data is not larger, the controller writes the new data in the storage area.

7. A method of storing data using a storage device comprising:
controlling an input/output (I/O) device to one or more physical storage resources via a controller;
providing, via the controller, virtual volume that serves as a logical address space;
managing, via the controller, a pool that serves as a logical storage space based on the one or more physical storage devices;
compressing, via the controller, data written in the virtual volume;
writing, via the controller, the compressed data in the pool; and
when new data for updating the data to which a storage area is already allocated in the pool and is written in the virtual volume,
compressing the new data;
determining that a size of the compressed new data is larger than a size of the storage area;
based on the determination that the compressed data is larger, writing the compressed new data in a different storage area;
based on the determination that the compressed data is larger, and the compressed new data is written in a different storage area, the storage area is made to be a garbage area; and
based on the determination that other compressed new data is larger than the size of an other storage area, the controller determines whether the other compressed new data is smaller than or equal to a size of the garbage area, and based on the determination that the other compressed new data is not larger, the other compressed new data is written in the garbage area, the garbage area is made to be the storage area and the other storage area is made to be a different garbage area.

8. The method of storing data using the storage device according to claim 7,
wherein the garbage area in which the other compressed new data is written is a garbage area having a smallest size among a plurality of garbage areas having a size equal to or larger than the size of the other compressed new data.

9. The method of storing data using the storage device according to claim 7,
   when a garbage area having a size equal to or larger than the size of the other compressed new data is not found, the other compressed new data is written in an unallocated storage area.

10. The method of storing data using the storage device according to claim 7,
    wherein the different storage area is an unallocated storage area.

11. The method of storing data using the storage device according to claim 7,
    when a total pool use amount exceeds a threshold value, writing, via the controller, the other compressed new data in the garbage area;
    when the total pool use amount does not exceed the threshold value, writing, via the controller, the other compressed new data in an unallocated storage area.

12. The method of storing data using the storage device according to claim 7, wherein based on the determination that the compressed data is not larger, the controller writes the new data in the storage area.

* * * * *